(12) United States Patent
Geswender et al.

(10) Patent No.: US 7,849,797 B2
(45) Date of Patent: Dec. 14, 2010

(54) PROJECTILE WITH TELEMETRY COMMUNICATION AND PROXIMITY SENSING

(75) Inventors: Chris E. Geswender, Green Valley, AZ (US); Stephen E. Bennett, Tucson, AZ (US); Cesar Sanchez, Tucson, AZ (US); Matthew A. Zamora, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 69 days.

(21) Appl. No.: 12/262,457

(22) Filed: Oct. 31, 2008

(65) Prior Publication Data

US 2010/0107915 A1   May 6, 2010

(51) Int. Cl.
*F42C 13/04* (2006.01)
(52) U.S. Cl. .................................... 102/211; 342/68
(58) Field of Classification Search ............... 102/211; 342/68, 120, 123, 57, 58, 119; 89/6
See application file for complete search history.

(56) References Cited

U.S. PATENT DOCUMENTS

| | | | | |
|---|---|---|---|---|
| 3,210,747 A | * | 10/1965 | Clynes | 340/870.13 |
| 3,289,204 A | * | 11/1966 | Murray et al. | 342/58 |
| 3,550,124 A | * | 12/1970 | Heft et al. | 342/58 |
| 3,662,391 A | * | 5/1972 | Brown | 342/462 |
| 3,727,554 A | * | 4/1973 | Packard | 102/214 |
| 3,777,665 A | * | 12/1973 | Ziemba | 102/215 |
| 3,850,102 A | * | 11/1974 | Morrow | 102/210 |
| 4,183,303 A | * | 1/1980 | Krupen | 102/211 |
| 4,214,240 A | * | 7/1980 | Weiss | 342/16 |
| 4,458,246 A | * | 7/1984 | Filipsson et al. | 342/60 |
| 5,181,039 A | * | 1/1993 | Oswald et al. | 342/119 |
| 5,525,975 A | | 6/1996 | Walker et al. | |
| 5,539,410 A | | 7/1996 | Zveglich | |
| 5,760,743 A | * | 6/1998 | Law et al. | 342/458 |
| 6,834,591 B2 | * | 12/2004 | Rawcliffe et al. | 102/214 |
| 7,098,841 B2 | * | 8/2006 | Hager et al. | 342/68 |
| 7,533,612 B1 | * | 5/2009 | Papayianis et al. | 102/211 |

OTHER PUBLICATIONS

"Manchester Code", Wikipedia, the free encyclopedia, [retrieved online Oct. 14, 2008], <http://en.wikipedia.org/w/index.php?title=Manchester_code&printable=yes>.
"Differential Manchester Encoding", Wikipedia, the free encyclopedia, [retrieved online Oct. 14, 2008], <http://en.wikipedia.org/w/index.php?title=Differential_Manchester_encoding&printable=...>.

* cited by examiner

*Primary Examiner*—Michael Carone
*Assistant Examiner*—Reginald Tillman, Jr.
(74) *Attorney, Agent, or Firm*—Renner, Otto, Boisselle & Sklar, LLP

(57) ABSTRACT

A projectile fuze sends a signal having encoded telemetry data. The telemetry data may be encoded by modulating an aspect or characteristic of the signal, such as frequency modulation of the signal. The fuze may receive and interpret reflections in order to determine proximity to a target or other object, such as by functioning as a height of burst sensor. The signal may include a series of random or seemingly random pulses (a keyed pattern of pulses), such as pulses in amplitude of the signal. The fuze includes a pair of transceivers for sending signals of different frequencies through an antenna, and for receiving signals through the antenna. The transceivers are configured such that one or the other is used at any one time when telemetry data is sent, with telemetry being encoded by changes in frequencies.

20 Claims, 3 Drawing Sheets

PROJECTILE WITH TELEMETRY COMMUNICATION AND PROXIMITY SENSING

BACKGROUND OF THE INVENTION

1. Field of the Invention

The invention is in the field of fuzes for projectiles.

2. Description of the Related Art

Prior projectiles and missile have generally used separate telemetry systems, such as for use in research and development phases. Such separate telemetry packages have tended to be heavy and use substantial amounts of volume.

Improvements in telemetry systems for projectiles would be desirable.

SUMMARY OF THE INVENTION

Smart fuzes, fuzes that gather and use data for triggering detonation, require additional functionality packed into a very small volume. Replacement fuzes may be used for current munitions, such as artillery rounds. It may be desirable to make a field replacement of fuze unit with a fuze having a telemetry function. Further, it may be desirable to have a filed replaceable unit having both a telemetry function and a height of burst function.

According to an aspect of the invention, a fuze uses transmission of telemetry data for proximity sensing, such as a height of burst sensor.

According to another aspect of the invention, a fuze encodes telemetry data by frequency modulation, and has a pair of transceivers for transmitting the telemetry data at different respective frequencies, and for receiving reflections of the telemetry data, for purposes such as proximity sensing or height of burst sensing.

According to yet another aspect of the invention, a method of operation of a projectile fuze includes sending telemetry data and using the telemetry data signal to operate as a height of burst sensor.

According to still another aspect of the invention, a method of operation of a projectile fuze includes transmitting a telemetry data signal and receiving reflections of the telemetry data signal.

According to a further aspect of the invention, a fuze sends frequency modulated telemetry data.

According to a still further aspect of the invention, a method of sending telemetry data from a height of burst fuze of a projectile involves encoding the telemetry data with changes in frequency.

According to another aspect of the invention, a method of communication and sensing from a projectile includes: transmitting from the projectile a signal having encoded telemetry data; and receiving at the projectile a reflection of the signal, for detecting proximity of the projectile to an object, such as the ground.

According to yet another aspect of the invention, a projectile includes: a projectile body; and a smart fuze that is coupled to the projectile body, wherein the smart fuze includes a communication system that simultaneously transmits telemetry data and functions as a height of burst sensor.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A projectile fuze sends a signal having encoded telemetry data. The telemetry data may be encoded by modulating an aspect or characteristic of the signal, such as frequency modulation of the signal. The fuze may receive and interpret reflections in order to determine proximity to a target or other object, such as by functioning as a height of burst sensor. The signal may include a series of random or seemingly random pulses (a keyed pattern of pulses), such as pulses in amplitude of the signal. The fuze includes a pair of transceivers for sending signals of different frequencies through an antenna, and for receiving signals through the antenna. The transceivers are configured such that one or the other is used at any one time when telemetry data is sent, with telemetry being encoded by changes in frequencies, shifting back and forth between the transceivers sending data at different fixed frequencies. Whichever of the transceivers is not transmitting at a given time is configured to receive signals from the antenna, and forward any returned signed to a returned signal detector of the fuze, for interpretation to determine proximity to a target or other object, such as the ground. Thus at all times the system is capable of receiving signals, even when transmitting telemetry data. The transceivers are both coupled to a data formatter and the returned signal detector.

Figure 1:
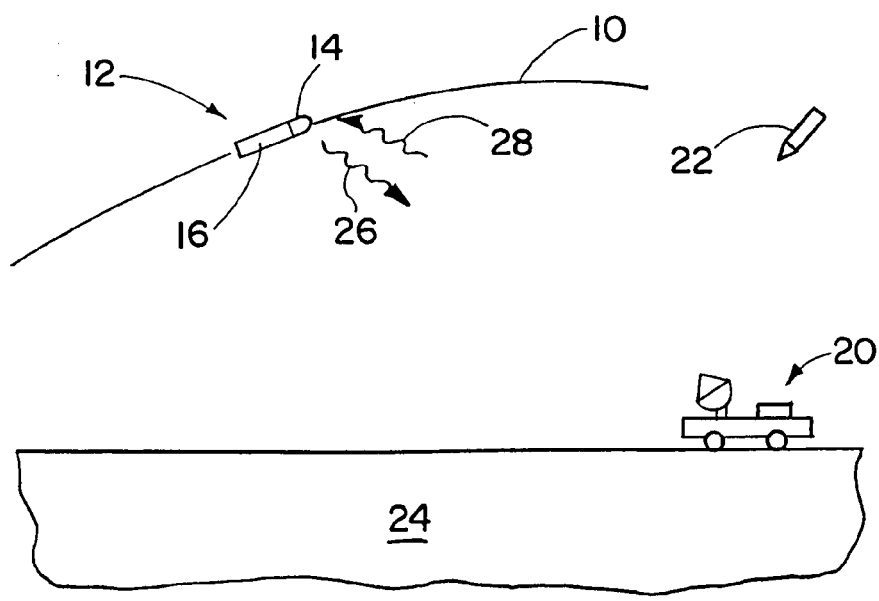
FIG. 1 is a schematic of a flight path of a projectile in accordance with an embodiment of the invention.
Figure 2:
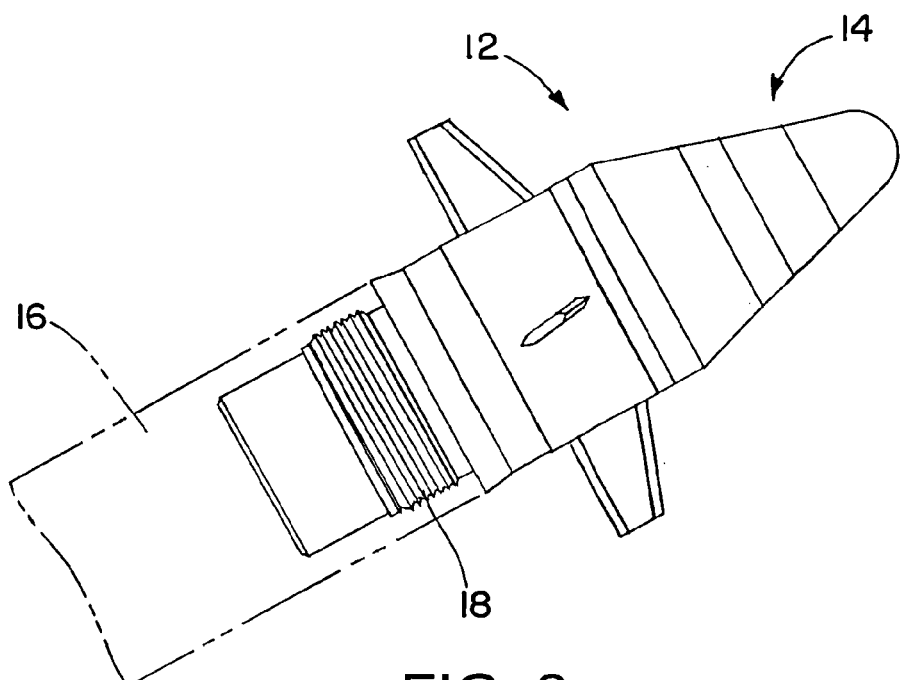
FIG. 2 is a side view of part of the projectile shown in FIG. 1.

FIG. 1 shows a flight path 10 of a projectile 12, with FIG. 2 showing a fuze system 14 of the projectile 12. The fuze system 14 may be a field replaceable unit that couples to a projectile body 16 using threads 18, having a function during normal operation of detonating an explosive of the projectile 12. The fuze 14 also has a communication system which is used both to communicate telemetry data to a remote receiver, such as a ground station 20, and to determine proximity of the projectile 12 to an object, such as a target 22 or the ground 24. To accomplish this, the fuze system 14 produces and transmits or sends radio frequency signals 26, and receives reflections 28 of the signals 26 from the target 22 and/or the ground 24. Thus the signals 26 may be used simultaneously for two purposes, for sending telemetry data regarding performance of the projectile 12, and for determining proximity to the ground or another object.

The projectile 12 may be a gun-fired artillery round, or alternatively any of a variety of other types of munitions. Other details regarding the general layout of the projectile 12 may be found in co-owned U.S. patent application Ser. No. 12/205,953, filed Sep. 8, 2008, which is incorporated herein by reference in its entirety.

Figure 3:
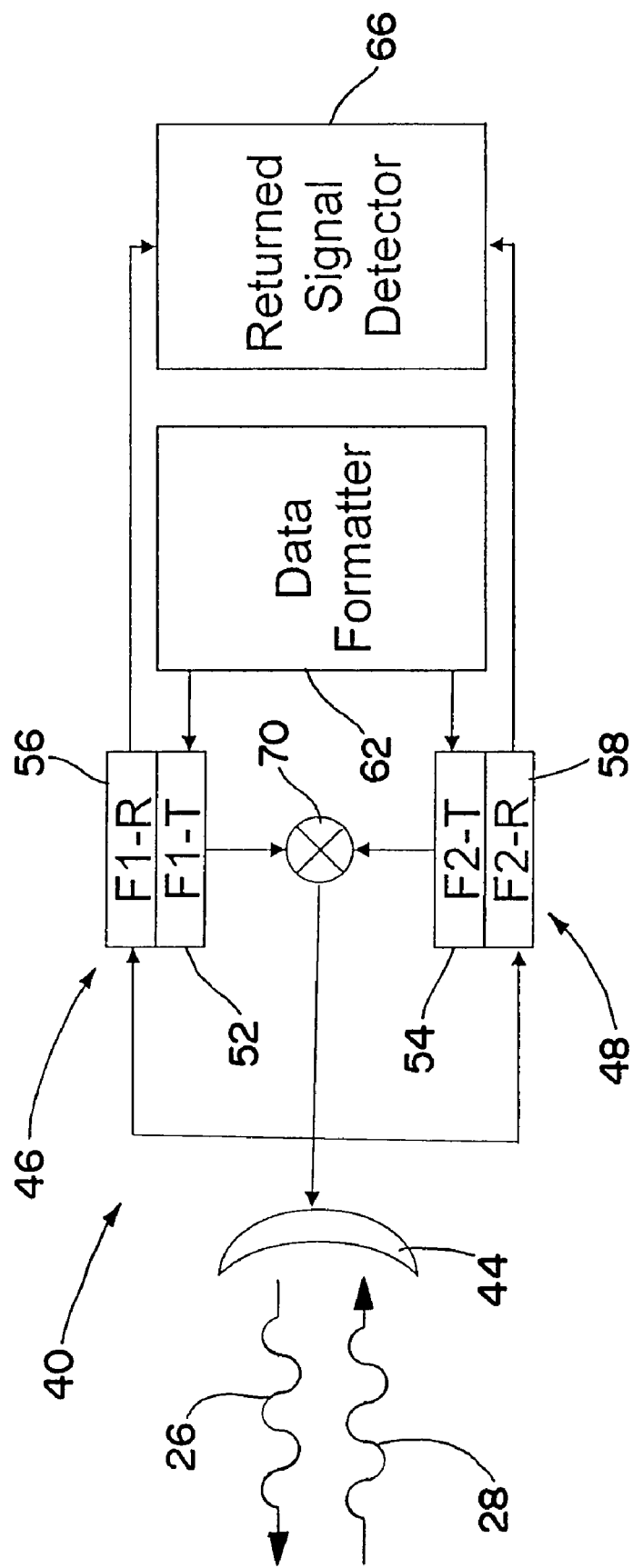
FIG. 3 is a schematic diagram of a communication system of the projectile of FIGS. 1 and 2.

FIG. 3 shows details of the communication system 40 of the fuze 14. The communication system 40 includes an antenna 44 for sending and receiving RF signals 26 and 28. The antenna 44 may be a patch antenna or other suitable type of antenna. The antenna 44 is coupled to a pair of transceivers 46 and 48, for sending and receiving signals through the antenna 44. The transceivers 46 and 48 have respective transmitters 52 and 54 that can be used to transmit signals at different respective frequencies for broadcast from the antenna 44 as the RF signals 26. The transceivers 46 and 48 also have respective receivers 56 and 58 for receiving, conditioning, and passing along signals received by the antenna 44.

A data formatter 62 is coupled to the transmitters 52 and 54 for formatting data signals to be sent by the transmitters 52 and 54. The telemetry data may be encoded by frequency modulation, switching the signal transmission back and forth between being sent by the transmitter 52 and the transmitter 54. The encoding of the frequency modulation may be any of a variety of encoding schemes. One example is any of a variety of schemes involving Manchester encoding, in which data (such as a telemetry data) is modulated against a system clock with an exclusive OR. This creates a modulated pattern having components that represent both the clock and the data. This allows data to be sent at a clock rate and easily reconstructed at the receiving end, such as at the ground station 20 (FIG. 1). The signal high is sent to one of the transmitters 52 and 54, and the signal low is sent to the other of the transmitters 52 and 54, to be transmitted by the transmitters 52 and 54 at different respective frequencies.

A returned signal detector 66 is coupled to both of the receivers 56 and 58. The returned signal detector 66 may be configured to analyze return (reflected) signals received by the communication system 40 to determine a proximity from a reflector that outgoing signals reflect off of, examples of possible reflectors being the target 22 (FIG. 1) and/or the ground 24 (FIG. 1). The returned signal detector 66 compares previously sent signals to the returned (reflected) signals received in order to the time taken for the signals to travel to the reflector and back. This back-and-forth travel time may be used to determine the distance between the projectile 12 and the reflector. The result may be a determination of distance from the projectile 12 to the target 22, or a determination of the height of the projectile 12 above the ground 24. One use for the determination is to detonate the projectile 12 at a certain height above the ground 24, as a height of burst trigger. The communication system 40 thus may be part of a height of burst system use to trigger detonation of an explosive material of the projectile 12. Of course information regarding the height of the projectile 12 at points during its flight, up to its detonation, provide useful information about the performance of the projectile 12. The analysis of the telemetry signals reflected back to the projectile 12 may be used to generate data which may be broadcast or downlinked as further telemetry signals.

The analysis of the returned signals by the returned signal detector 66 may be performed by any of variety of suitable methods. Returned signals received at the detector 66 may be grouped by time intervals into a series of range bins, with each time interval corresponding to a given distance between the projectile 12 and a reflecting object. Energy of emitted or broadcast signals may be compared with the received energy in the range bins. Alternatively or in addition, the analysis of the reflected returned signals may involve looking for patterns of energy pulses (such as amplitude pulse) in the returned signals and correlation or other comparison of the timing of the received pulses with those of that were in signals previously sent. The sent pulses may be incorporated as a regular part of the sent signal in a random, pseudo-random, or other unpredictable pattern that functions as a keyed pulse pattern that can be detected and identified by the detector 66. The incorporation of such an irregular pulse pattern may be done in order to frustrate attempts to jam signals or otherwise interfere with the processing of reflected signals. The pulse correlation of pulses sent with reflected pulses (either time delay or energy received) may be used to at least ameliorate the effects of attempts at jamming the communication system 40.

The transmitters 52 and 54 are shown as separate to some degree from the receivers 56 and 58. However it will be appreciated that the transmitters 52 and 54, and the receivers 56 and 58, may be different aspects of the single structures in each of the transceivers 46 and 48. Transmission of signals may be accomplished using local oscillators configured to create signals at given frequencies. The receive functions may be accomplished by suitable components such as high-gain amplifiers and comparators. The comparators may be used to forward received signals to the amplifiers only when a noise threshold is exceeded.

The outputs from the transmitters 52 and 54 are combined at a signal combining junction 70. The outgoing signal proceeds from the combining junction 70 to the antenna 44, where it is broadcast or otherwise transmitted as the signal 28.

At any one time transmission is occurring from only one of the transmitters 52 and 54, while the other of the transmitters is idle. The transceiver 46 or 48 corresponding to the idle transmitter 52 or 54 is set to receive, using the corresponding receiver 56 or 58. Thus at least one of the transceivers 46 and 48 is always set to have its corresponding receiver 56 and 58 in receive mode. This feature of always having at least one of the receivers 56 and 58 in receive mode, able to receive the signals 26 from the antenna 44 and forward them to the detector 66, is achieved without having any additional receiver apart from the two transceivers 46 and 48 that are used to transmit the signals 28.

It will be appreciated that the switching for putting the transceivers 46 and 48 into appropriate send and receive modes may be accomplished in any of a variety of suitable ways. Suitable signals may be sent to the transceivers 46 and 48 to change or set their modes as transmit or receive.

Figure 5:
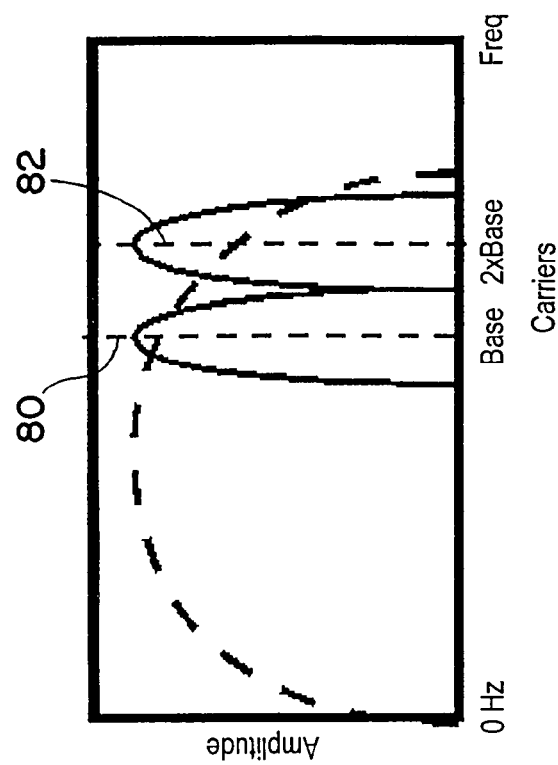
FIG. 5 is a diagram illustrating frequencies used in the communication system of FIG. 3.
Figure 4:
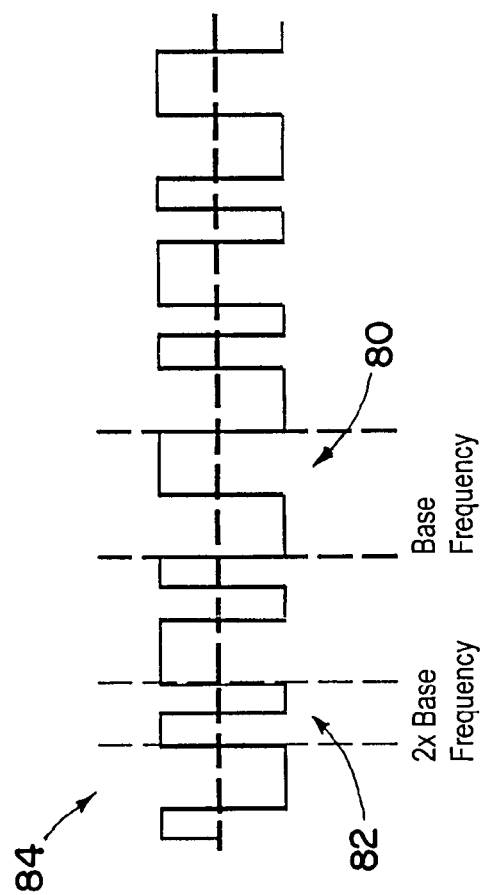
FIG. 4 is a diagram of a signal produced by the communication system of FIG. 3.

With reference now to FIGS. 4 and 5, the modulation may be between two frequencies, a base frequency 80 and a high frequency 82 (higher than the base frequency), for example having a frequency twice that of the base frequency (or alternatively at another multiple of the base frequency, or a non-multiple of the base frequency). The signal 84 may be modulated between the two frequencies 80 and 82 to transmit telemetry data. In addition, the signal 84 may be amplitude modulated to transmit non-informational characteristics, such as a keyed pulse pattern that can facilitate ranging by evaluation of reflected signals. It will be appreciated that the frequency separation will be a function of the Q (quality factor) of the receiving filters and the expected Doppler shift the system is to accommodate.

The transmitters 52 and 54 may be 250 mW transmitters, the base frequency 80 may be about 2255.5 MHz. The transmission of data can be at the base rate of 2255 Megabits/sec at full bit rate. It will be appreciated that these are only example values, and that many different values may be employed.

It will be appreciated that many alternatives are possible in the configuration and operation of the projectile 12. For example it will be appreciated that the fuze communication system may alternatively have three or more transceivers, each operable to transmit at a different frequency to provide more frequency agility It will be appreciated that the projectile advantageously combined telemetry-sending and ranging (proximity determination) by analysis of reflected signals in a single communication system that both sends the telemetry signals (signals encoded with telemetry data) and receives and analyzes reflections from these signals. The system always has at least one transceiver in receive mode, so that the system is able to receive and analyze signals even when transmitting telemetry data. This allows telemetry data to be sent constantly or nearly constantly while still performing ranging operations, such as determining a height of burst.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of communication and sensing from a projectile, the method comprising:
    producing a signal, wherein the producing includes encoding telemetry data in the signal by frequency modulation;
    transmitting from the projectile the signal having the encoded telemetry data; and
    receiving at the projectile a reflection of the signal, for detecting proximity of the projectile to an object;
    wherein the encoding includes sending respective parts of the signal to two different transceivers to transmit a first signal and a second signal at different respective frequencies.

2. The method of claim 1, wherein the different frequencies include a base frequency and a second frequency substantially at an integer multiple of the base frequency.

3. The method of claim 1, wherein the encoding includes Manchester encoding.

4. The method of claim 1, wherein the signal includes a keyed pattern of amplitude pulses.

5. The method of claim 4, further comprising analyzing the received reflection of the signal for presence of the pattern of amplitude pulses.

6. The method of claim 1, wherein the projectile has a pair of transceivers for transmitting the signals and receiving the reflections of the signals.

7. The method of claim 6, wherein the transceivers are capable of simultaneously transmitting and receiving, with one of the transceivers in receive mode while the other of the transceivers is in transmit mode.

8. The method of claim 7, wherein the transceivers are both coupled to an antenna of the projectile.

9. The method of claim 6,
    wherein the signal is encoded for the telemetry data by frequency modulation; and
    wherein the transceivers transmit different parts of the signal at different frequencies.

10. The method of claim 1, further comprising analyzing the reflection of the signal to determine height of the projectile.

11. The method of claim 1,
    wherein the projectile includes a smart fuze with a communication system; and
    wherein the transmitting and the receiving is performed by the communication system of the smart fuze.

12. The method of claim 11,
    wherein the communication system includes a pair of transceivers used to selectively both 1) transmit the telemetry data at the different respective frequencies, as part of the transmitting, and 2) receive the reflections of transmitted signals, as part of the receiving; and
    wherein both of the transceivers are coupled to an antenna of the communication system, for the transmitting of the telemetry data and the receiving of the reflections.

13. The method of claim 12, wherein at any one time one of the transceivers is in receive mode while the other of the transceivers is in transmit mode.

14. The method of claim 13, wherein the different frequencies include a base frequency and a second frequency substantially at an integer multiple of the base frequency.

15. The method of claim 14, wherein the encoding includes Manchester encoding.

16. The method of claim 14, wherein the signal includes a keyed pattern of amplitude pulses.

17. The method of claim 11, further comprising the smart fuze analyzing the reflection of the signal to determine height of the projectile.

18. The method of claim 17, wherein the analyzing includes grouping the reflection of the signal by time intervals into a series of range bins, with each of the time intervals corresponding to a given distance between the projectile and the object.

19. The method of claim 18, wherein the analyzing further includes comparing energy of the reflection with energy of the signal.

20. The method of claim 18, wherein the analyzing further includes looking for patterns of energy pulses in the reflection, and comparing timing of the energy pulses with sending of similar pulses in the signal.

* * * * *